United States Patent [19]

Eklund, Sr.

[11] 3,990,689

[45] Nov. 9, 1976

[54] ADJUSTABLE HOLDER ASSEMBLY FOR POSITIONING A VACUUM CHUCK

[76] Inventor: Ralph H. Eklund, Sr., 1111 Morse Ave., No. 235, Sunnyvale, Calif. 94086

[22] Filed: Aug. 11, 1975

[21] Appl. No.: 603,498

[52] U.S. Cl. ............................... 269/21; 90/58 R; 269/71; 408/109;
[51] Int. Cl.² ......................................... B25B 11/00
[58] Field of Search ...................... 408/76, 91, 109; 90/58 R; 279/3 269/21;71

[56] References Cited
UNITED STATES PATENTS

| | | | |
|---|---|---|---|
| 3,090,284 | 3/1963 | Dunning | 90/58 R |
| 3,202,895 | 8/1965 | Arp et al. | 90/58 X |
| 3,566,720 | 3/1971 | Phillips | 90/58 R |
| 3,730,634 | 5/1973 | Gerber et al. | 408/76 X |

Primary Examiner—Leon Gilden
Attorney, Agent, or Firm—Boone, Schatzel, Hamrick & Knudsen

[57] ABSTRACT

An adjustable holder assembly for positioning a vacuum chuck relative to a bed including a base plate having an integrally formed pivot mount for rotatably affixing the plate to a bed providing a first degree angular displacement $\theta 1$. A lower stage includes a housing having bearing ways formed on the bottom of said housing spaced to slidably mate with the tracks in the base plate, a lead screw extending through said housing and a concentric shaft with cord means encircling said shaft, the lower stage housing having substantially parallel tracks formed in the top surface at right angles to the bottom surface ways. An upper stage includes a housing having bearing ways formed on the bottom surface for slidably mating with the tracks in the top surface of the lower housing, pillow blocks slidably engaging the lead screw, upper housing having a central bore, and a chuck member slidably positioned in the bore having a handle for rotating the chuck member about the axis of the bore to provide a second degree of an angular displacement $\theta 2$. Stops restrict the upward and downward travel of the chuck member in the bore, yieldable spring means urge the member against the upward stop and means urges downward travel of the member against the force of the yieldable spring means to provide movement in a Z plane.

8 Claims, 3 Drawing Figures

Fig_1

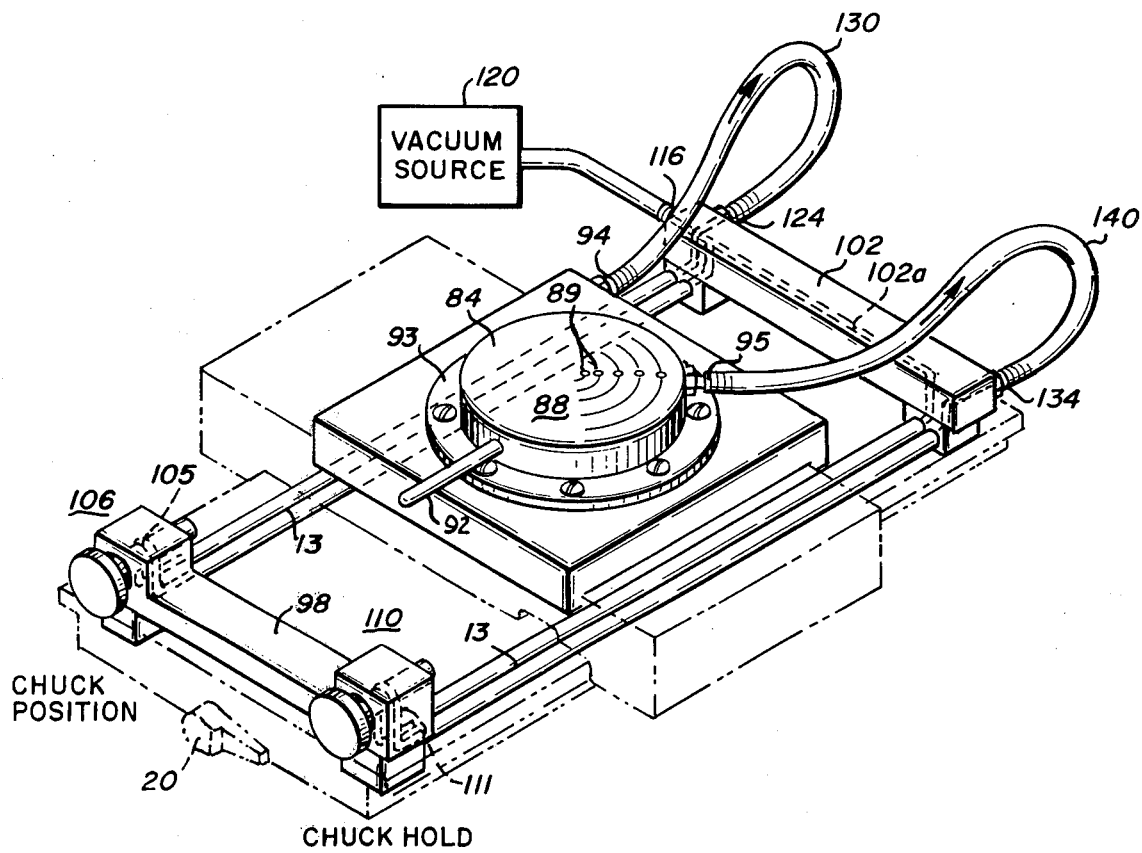
Fig_3

ADJUSTABLE HOLDER ASSEMBLY FOR POSITIONING A VACUUM CHUCK

BACKGROUND OF THE INVENTION

1. Field of the Invention

The present invention relates generally to an adjustable holder assembly for positioning and holding a part or component. More particularly, the present invention relates to adjustable holder assembly for positioning a vacuum chuck holding a semiconductor wafer for examination and testing.

2. Description of the Prior Art

Although adjustable holder assemblies including stages providing movement in X and Y planes are known in the art, they suffer from dead areas in which the chuck cannot either be positioned or its rotation is limited, the chuck is not fully supported in all areas, and positioning requires a series of interactive adjustments to bring the chuck to a desired position.

Thus, there is clearly a need for an adjustable holder assembly providing positioning into all desired areas with a minimum of interaction between adjustments in each plane.

SUMMARY OF THE PRESENT INVENTION

Accordingly, it is a general object of the present invention to provide an improved adjustable holder assembly for positioning a chuck free of dead spots and with minimum interaction between plane adjustments.

Another object of the present invention is to provide a holder assembly having wide range, rapid traverse of a chuck in a Y plane to permit moving the chuck completely away from the working area.

Another object of the present invention is to provide a holder assembly having an improved single knob control of movement in both the X and Y planes.

Another object of the present invention is to provide a holder assembly having improved performance low friction bearing ways and zero backlash adjustments.

The foregoing and other objects of the invention are achieved in an adjustable holder assembly for positioning a vacuum chuck relative to a bed including a base plate having parallel tracks formed in the top surface of said plate and an integrally formed pivot mount for rotatably affixing the base plate to a bed to provide a first degree angular displacement $\theta 1$. A lower stage includes a housing having spaced bearing ways on the bottom surface to slidably mate with the tracks and the base plate, a lead screw extending through and rotatably mounted in the opposite side walls of the housing, an outer shaft concentric with the lead screw and cord means circling said shaft and extending along said plate to provide movement in a Y plane. The lower stage housing has parallel tracks formed in the top surface at right angles to the bottom surface ways. An upper stage is provided and includes a housing having spaced bearing ways formed on the bottom surface to mate with the tracks on the top surface of the lower housing. Pillow blocks are mounted to the upper stage housing slidably engage opposite sides of the lead screw to provide movement in an X plane, with the housing having a central bore at right angles to the top surface, a chuck member is slidably positioned in the bore and has a handle for rotating the member about the axis of the bore to provide a second degree of angular displacement $\theta 2$. The upper housing has stops to restrict the upward and downward travel of the chuck member in the bore and yieldable spring means for urging the member against the upward stop and means for urging downward travel of the member against the force of the yieldable spring means to provide movement in Z plane.

In the drawing:

FIG. 3 is a perspective view of the apparatus forming the vacuum communication paths of the embodiment shown in FIG. 1.

DETAILED DESCRIPTION OF THE PREFERRED EMBODIMENT

Figure 1:
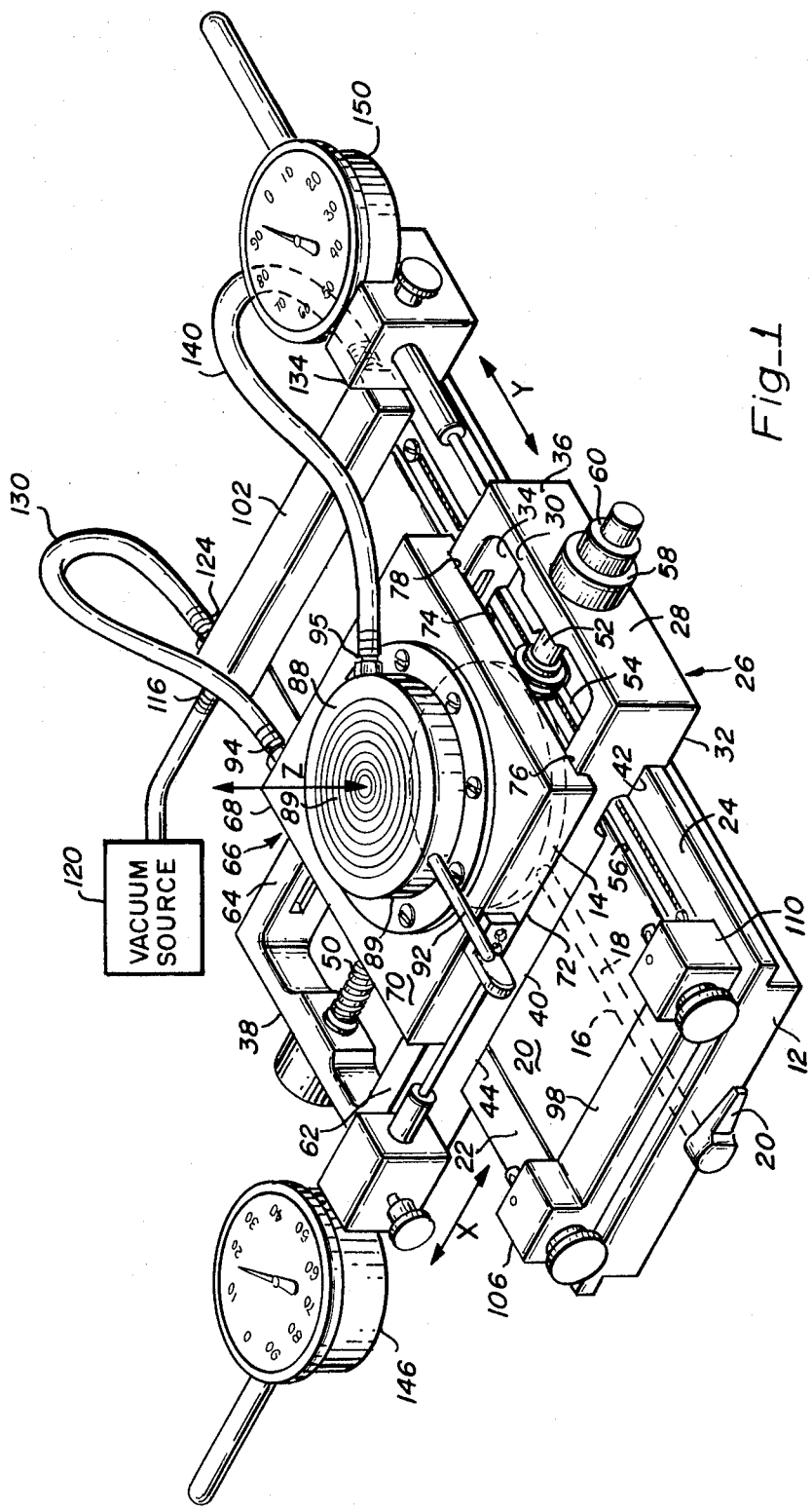
FIG. 1 is a perspective view of a preferred embodiment of the present invention.

Referring to FIG. 1, the adjustable holder assembly is shown and includes a base plate 12 having an integrally formed pivot mount or plug 14 for rotatably affixing the base plate 12 to a bed. Mount or plug 14 may be permanently bolted to a bench or bed to hold the entire assembly. The pivot mount or plug provides a first degree of angular displacement theta ($\theta 1$) relative to a bench or bed. Locking means is provided to lock the relationship of the base plate 12 to the pivot mount or plug 14. Such means may include an internally threaded passage 16 extending from the front edge of the base plate to expose the outer peripheral shoulder of the plug 14. A threaded rod 18 having a protruding front knob 20 may then be threaded within passage 16 and tightened to an interference fit with plug 14.

Base plate 12 has a top surface 20 and has spaced substantially parallel tracks 22 and 24 formed in the top surface 20 of plate 12. A lower stage 26 includes a housing 28 having top and bottom surfaces 30 and 32 respectively. The housing 28 has a cavity 34 formed therein extending from top surface 30 to bottom surface 32 to form side walls 36 and 38. Bottom surface 32 may have a groove 40 formed in said surface having a width sufficient to accept the spaced tracks 22 and 24 and side lips 12a–b of the base plate 12. The right inside corner of said groove includes a bearing way 42 formed on the housing 28 slidably mating with the track 24 in base plate 12. Similarly, the left inside corner of the groove 40 has a like bearing way 44 slidably mating with track 22 of base 12.

As will later be seen, layers 46 and 48, formed of non-metallic self-lubricating and non-sticking material, may be separate layers or strips interposed to form the respective bearings ways in contact with tracks 22 and 24. A lead screw 50 extends through and is rotatably mounted in the opposite sidewalls 36 and 38 of housing 28. An outer shaft 52 is mounted concentric with the lead screw and has cord means 54 encircling the shaft 52, such as cord wrapped on a pulley. The cord means 54 has ends extending parallel to track 24 within a groove 56 formed adjacent to track 24 with the respective ends of cord means 54 being affixed to the respective front and rear ends of base plate 12. An outer knob 58 is mounted on the concentric shaft 52. Rotating knob 58 causes the shaft to rotate and provide movement of the lower stage 26 on tracks 22 and 24 in a direction which may be termed the Y plane. An additional knob 60 is mounted concentric to knob 58 and is attached to lead screw 50 to provide for rotation of the lead screw as will be seen.

The lower stage housing 28 has spaced substantially parallel tracks 62 and 64 formed in the top surface of the housing at right angles to the bottom surface ways 42 and 44. Tracks 62 and 64 carry an upper stage 66 including a housing 68 having a top surface 70 and bottom surface 72. A groove 74 is formed in the bottom surface of the housing having right and left corners spaced to slidably mate with tracks 62 and 64 in the top surface of the lower housing. Strips or layers of non-metallic, self-lubricating, non-sticking material may be interposed to form bearing ways 76 and 78.

Although not shown in FIG. 1, pillow blocks are attached to the underside of housing 68 and slidably engage opposite sides of lead screw 50. When the lead screw 50 is rotated using knob 60, the stage moves at right angles to housing 26 movement or along an X plane. The upper stage housing carries a chuck member 84 having a top holding surface 88 and a handle 92 for rotating member 84. Front and rear vacuum manifolds 98 and 102 are provided, with front manifold 98 having a chuck member actuator 106 mounted in the left side of said manifold and a chuck holding surface actuator 110 mounted in the right portion of said manifold. The rear manifold 102 has a fitting 116 connected to a vacuum source 120. Manifold 102 has an additional fitting 124 connected to the vacuum inlet 128 for the movement of the chuck member via hose 130. Manifold 102 has an additional fitting 134 connected to the chuck holding surface vacuum inlet 138 via hose 140. Displacement gauge means are provided to measure the respective X plane and Y plane travel, the X plane gauge means 146 being coupled between the lower stage 126 and upper stage 66 to measure the relative displacement between the respective stages. Similarly, Y plane gauge means 150 is mounted to base plate 12 and coupled to lower stage 26 to measure the relative displacement of the lower stage with respective to the base plate 12.

Figure 2:
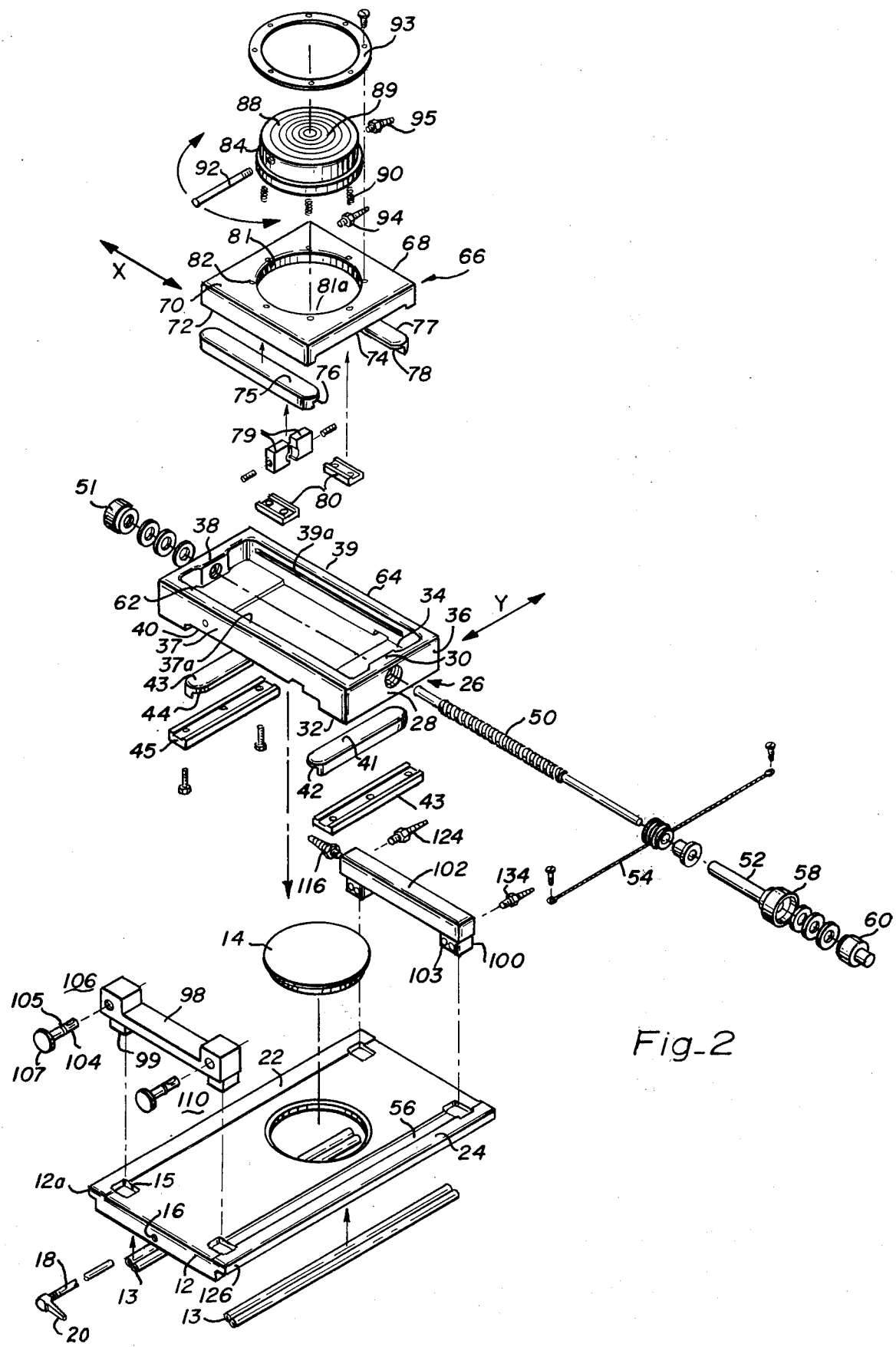
FIG. 2 is an exploded view of the embodiment of the present invention shown in FIG. 1.

Referring to FIG. 2., an exploded view of the adjustable holder assembly is shown. Base plate 12, having an internally threaded bore 16 for receiving threaded shaft 18 for tightening against the mount or plug 14, is more clearly shown. Side protruding lips 12a and 12b are shown extending the length of the respective side edges of base plate 12.

Base plate 12 has apertures 15 formed in each of the four corners of plate 12 and extending therethrough. Apertures 15 are suitable for receiving the downward extending feet of first and second manifolds as will later be seen. Paired, spaced vacuum communication tubes 13 extend lengthwise between apertures 15 on the underside of plate 12. Grooves may be formed in the bottom surface of plate 12 suitable for receiving the paired vacuum tubes. A groove 56 is formed on the top side of plate 12 extending between the rightmost apertures 15 and alongside track 24.

The lower stage 26 incldues a housing 28 having top and bottom surfaces 30 and 32, respectively. The housing 28 has a cavity 34 extending from top to bottom surfaces to form opposite sidewalls 36 and 38. The remaining opposing sidewalls 37 and 39 have shallow holddown grooves 37a and 39a formed adjacent top surface 30 in the confronting inward surfaces of the respective sidewalls. Bottom surface 32 has a relatively shallow groove 40 form extending upward and having a width sufficient to accept, in the respective right and left corners of said groove, bearing layers or strips 41 and 43 having bearing ways 42 and 44 which slidably mate with tracks 22 and 24 to carry the assembly. The layers or strips 41 and 43 extend to wrap around the top edge of respective lips 12a and 12b to center the assembly. Holddown plates 43 and 45 have inward edges riding below lips 12a and 12b and are affixed such as by screws to strips 41 and 43 and to the bottom side of housing 28, thereby holding the assembly to the base plate 12 but still permitting slidable mating of ways 42 and 44 with respective tracks 24 and 22.

A lead screw 50 extends through and is rotatably mounted such as by bearings in the opposite sidewalls 36 and 38 of housing 28. The protruding left end of lead screw 50 has a nut 51 attached to its outer end which is spaced from the housing by conventional washer means to provide free rotation. The right protruding end of lead screw 50 has a concentric outer shaft 52 slidably mounted thereon and a pulley and cord means 54 mounted on outer shaft 52. Cord and pulley means 54 may comprise a nylon cord having several turns encircling the pulley affixed to shaft 52 with the cord extending outward along track 56 and being suitably affixed to the ends of the track 56. Shaft 52 has a knob 58 affixed thereto utilized in combination with conventional collar means on the inward side of the knob and washer means on the outboard side to permit free rotation. An additional knob 60 is mounted on the tip end of the protruding shaft of the lead screw to provide for rotation of the lead screw. The housing 28 additionally has spaced substantially parallel tracks 62 and 64 formed in the top surface of housing 28 and at right angles to the bearing ways 42 and 44.

The assembly further includes an upper stage 66 with an upper housing 68 having a top surface 70 and a bottom surface 72. A groove 74 is formed in the bottom surface 72 extending upwardly to form left and right inside corners within housing 68. Separate layers or strips formed of non-metallic, self-lubricating and non-sticking material are positioned in the inside corners of the groove and wrapped around mating tracks 62 and 64 which slidably mate with bearing ways 76 and 78. First and second pillow blocks 79 have their top surfaces mounted to the underside of housing 68 on the top wall of groove 74. Pillow blocks 79, also of non-metallic, self-lubricating and non-sticking material, are spaced to slidably engage opposite sides of the threaded portion of lead screw 50. During initial adjustment, blocks 79 may be tightened on the threaded portion of lead screw 50 to form a self-threaded surface on the semi-circular faces of the pillow blocks engaging the lead screw threads. Conventional screw means may be utilized to adjust the spacing between the respective pillow blocks to reduce or eliminate back lash.

The upper stage 66 has holddown plates 80 having respective outer edges which mate with grooves 37a and 39a. Holddown means such as conventional screws extend through the holddown plates 80 and through strips 75 and 77 to attach the plates to housing 68. Bearings ways 76 and 78 carry the upper stage with holddown plates 80 still permitting slidable mating of the bearing ways 76 and 78 with the tracks 62 and 64 of lower stage 26. Housing 68 has a bore 81 extending downward from surface 70 to form a chamber 81 central to housing 68 and having an axis at substantially right angles to surface 70. Plural threaded holes 82 extend downward from surface 70 and are equally spaced about the periphery of bore 81.

A chuck member 84 is provided slidably positioned in the bore 81. The chuck member 84 has a top holding surface 88 having a plural hold 89 formed therein. Chuck member 84 has a handle 92 for rotating the chuck member about the axis of bore 81 to provide a second degree of angular displacement $\theta 2$. The bottom surface of member 84 has plural holes formed therein to receive plural compression springs 90 with the bottom end of the compression springs 90 being directed against the bottom wall 81a of the chamber or bore 81.

A mounting ring 93 slides over the upper necked down portion of chuck member 84 and has plural mounting holes therein such that screws extending through said holes may mate and be threaded within plural holes 82 formed within the upper housing. The ring 93 thus provides an upward stop to restrict the upward travel of the chuck member 84, with the plural compression springs 90 providing yieldable spring means for urging the member 84 against the upward stop provided by ring 93. The downward stop for movement of member 84 is provided by the bottom wall 81a of bore or chamber 81. A vacuum fitting 94 is mounted in housing 68 and is in vacuum communication with the bore or chamber 81, particularly that portion below the chuck member 84. External vacuum means is provided for urging downward travel of the chuck member 84 against the force of the yieldable spring means 90 to provide movement of the chuck member 84 in a Z plane. A fitting 95 is provided in vacuum communication with the plurality of holes formed in the top holding surface 88 of the chuck member.

Referring to the vacuum distribution mechanism of FIG. 2, a front manifold 98 having a downward protruding feet 99 is mounted at the front edge of base plate 12, the downward protruding feet extending to mate with apertures 15 and further extending to couple to paired tubes 13 beneath the plate 12. A rear manifold 102 has downward protruding feet 100 engaging the rearward apertures 15 and extending below plate 12 to couple with tubes 13 via paired communication bores 103 formed in each of the downward extending feet of manifolds 98 and 102 and mating with tubes 13. A left actuator 106 is provided in front manifold 98 having a plunger 104 slidably engaging a vacuum bore in actuator 106, the plunger member having a groove 105 formed around the outward surface of the plunger rod and having a plunger knob 107.

As will be seen, the vacuum communication path between the frontward ends of tubes 13 may be blocked when the plunger 106 is pulled out, that is, outwardly extended from the manifold 98. Sliding the plunger 104 inward provides a free communication path between the paired tubes 13 via the groove 105. The right actuator 110 is of like structure and operation. The rear manifold 102 has a fitting 116 provided at the left end for connection to a vacuum source and is in vacuum communication via the manifold 102 with the innermost tubes of the respective paired tubes 13. The outermost tubes of each of the pairs are in communication with fittings 124 and 134 mounted on the back side of the manifold 102.

Referring to FIG. 3, the vacuum actuators and communication paths are shown. Vacuum source 102 is connected to fitting 116 which is connected to common vacuum manifold 102a within rear manifold 102. Common tube 102a provides a first communication with the inward tube of the left pair 13 in density of the inward tube to chuck position actuator 106. When actuated as shown, the vacuum communication path from the source continues up through the downward extending foot 99 and is necked down as the path approaches plunger 104. When actuated plunger 104 having the groove 105 is in vacuum communication with the inward port connected to the inward tube 13 and also the outward port via the groove which is in like communication with the outward tube 13.

The outward tube 13 at the rear manifold 102 communicates upward to fitting 124 and thence, via tube 130 to fitting 94. Fitting 94 is in vacuum communication with chamber 81 below the chuck member 84. Thus, the application of the vacuum when chuck position actuator 106 is applied causes the outside air pressure to press down on member 84 urging its downward travel against the force of the yieldable spring means 90 previously described as a result of the lower air pressure provided by the vacuum in the chamber below member 84. When actuator 106 is pulled out, groove 105 no longer completes the communication path and thus, the yieldable spring means again urges the member 84 against the upward stop plate 93.

In operation of the chuck hold actuator 110, the vacuum is routed from the source via common tube 102a and the innermost tube of the right pair 13 to actuator 110. A similar groove 111 within actuator 110 identical to that of actuator 106 may then be selectively positioned to freely pass air via the communication path or interrupt the flow to the outermost tube and thence fitting 134 communicating with fitting 95 via tube 140. Plural holes 89 in the top surface 88 are in vacuum communication with fitting 95. Vacuum at fitting 95 causes external air pressure to force a part, such as a conductor wafer, downward against the plural holes 89 and circular grooves there connected, thereby holding the parts firmly to the surface 88. When the chuck position actuator 106 is actuated so that the chuck member 84 is downward extended, handle 92 may be manipulated as well as front handle 20 to perform a double-theta (1 and 2) adjustment to position the wafer. At the same time, knobs 58 and 60 (FIG. 1) may be adjusted to move the wafer in the Y and/or X planes as desired to correctly position the wafer or part.

Thus, it is clear that there has been provided an improved adjustable holder assembly for positioning a chuck free of dead spots and with minimum interaction between various X, Y and Z adjustments. Moreover, there has been provided an adjustable holder assembly having improved performance, low friction bearing ways and zero backlash adjustments.

What is claimed is:

1. An adjustable holder assembly for positioning a vacuum chuck relative to a bed comprising,
    a base plate having a top surface with spaced substantially parallel tracks formed therein said plate having an intergrally formed pivot mount for rotatably affixing the plate to a bed and for providing a first degree of angular displacement $\theta 1$ relative to the bed, said plate including locking means for maintaining a selected angular displacement,
    a lower stage including,
        a lower housing having top and bottom surfaces with a cavity formed therein extending from said top to bottom surfaces to form side walls and having spaced bearing ways formed on the bottom surface of said housing spaced to slidably mate with said tracks in said base plate,
        a lead screw extending through and rotatably mounted in opposite side walls of said lower housing,
        an outer shaft concentric with said lead screw, and cord means encircling said concentric shaft and having cord ends extending parallel to said tracks in said plate and affixed to said plate to provide movement of said lower stage in a Y plane when said outer shaft is rotated, said lower housing having spaced substantially parallel tracks formed in the top surface at right angles to said bottom surface, an upper stage including, an upper housing having top and bottom surfaces and having spaced bearing ways formed on the bottom surfaces and having spaced bearing ways formed on the bottom surface thereof spaced to slidably mate with the tracks in the top surface of said lower housing, said upper housing having a central bore at right angles to the top surface of said housing, said bore having stop means for limiting travel therein, pillow blocks mounted to said upper housing and slidably engaging opposite sides of said lead screw to provide movement in an X plane when said lead screw is rotated, a chuck member having a top holding surface with plural holes therein, said chuck member being slidably positioned in said bore between said stops and having a handle for rotating said chuck member about the axis of said bore to provide a second degree of angular displacement said $\theta 2$, stops in said upper housing restricting the upward and downward travel of said chuck member in the bore, spring means for urging the chuck member against the upward stop, and means for urging downward travel of the chuck member against the force of the spring means to provide movement in a Z plane.

2. A holder assembly as in claim 1 wherein said bearing ways are separate interposed layers of non-sticking material dissimilar to the material used for the tracks and wherein said pillow blocks are formed of like material.

3. A holder assembly as in claim 2 wherein the means for urging downward travel includes vacuum means.

4. A holder assembly as in claim 3 together with vacuum means in communication with the plural holes formed in the top holding surface of said chuck member.

5. A holder assembly as in claim 4 wherein spring means includes plural compression springs engaging the bottom side of the chuck member.

6. A holder assembly as in claim 1 wherein said locking means includes a threaded shaft carried by an internally threaded passage within said base plate and wherein said shaft is capable of being tightened to interference contact with said pivot mount.

7. A holder assembly as in claim 1 together with front and rear manifolds mounted on said base plate, vacuum means connected to said rear manifold, chuck surface and chuck member actuators mounted in said front manifold, said actuators being interposed in the vacuum communication path between the rear manifold and the chuck top surface and chuck member.

8. A holder assembly as in claim 1 together with a first displacement gauge means coupled between said lower housing and said base and a second displacement gauge means coupled between said lower housing and said upper housing.

* * * * *